United States Patent [19]

Shockling et al.

[11] Patent Number: 4,863,678

[45] Date of Patent: Sep. 5, 1989

[54] ROD CLUSTER HAVING IMPROVED VANE CONFIGURATION

[75] Inventors: Larry A. Shockling, Pittsburgh, Pa.; Trevor A. Francis, Colombia, S.C.

[73] Assignee: Westinghouse Electric Corp., Pittsburgh, Pa.

[21] Appl. No.: 91,056

[22] Filed: Aug. 27, 1987

Related U.S. Application Data

[63] Continuation-in-part of Ser. No. 806,722, Dec. 9, 1985, abandoned.

[51] Int. Cl.$^4$ .................................................. G21C 7/00
[52] U.S. Cl. ..................................... 376/327; 376/353; 376/463
[58] Field of Search ............... 376/327, 353, 462, 225, 376/463

[56] References Cited

U.S. PATENT DOCUMENTS

| | | | |
|---|---|---|---|
| 3,314,859 | 4/1967 | Anthony | 376/225 |
| 3,481,832 | 12/1969 | Rickert | |
| 4,035,230 | 7/1977 | Bevilacqua | |
| 4,432,934 | 2/1984 | Gjertsen et al. | 376/327 |
| 4,481,164 | 11/1984 | Bollinger | 376/327 |

FOREIGN PATENT DOCUMENTS

| | | | |
|---|---|---|---|
| 1013000 | 12/1965 | United Kingdom | |
| 0169424 | 5/1986 | European Pat. Off. | |
| 0225805 | 6/1987 | European Pat. Off. | 376/327 |
| 7560777 | 3/1969 | France | |
| 0158812 | 10/1985 | Japan | |
| 0159509 | 10/1985 | Japan | |

OTHER PUBLICATIONS

European Search Report (EP 86 30 9594), The Hague, 03-03-1987, Examiner Kavcic.

Primary Examiner—Harvey E. Behrend
Attorney, Agent, or Firm—D. C. Abeles

[57] ABSTRACT

A spider assembly for supporting a corresponding rod cluster in a pressurized water reactor vessel, through which the core outlet flow passes in a predetermined direction. Each spider assembly comprises a generally cylindrical, central hub disposed in parallel axial relationship to the predetermined direction of the core outlet flow and a plurality of vane assemblies. Each vane assembly comprises means for mounting at least one rod to the assembly and at least one vane element connecting the rod mounting means to the hub. Each vane element has generally parallel, major planar surfaces disposed parallel to the predetermined direction of flow and a square trailing edge configuration which mitigates the shedding forcing function on the spider resulting from the core outlet flow thereover, while maximizing material content and thereby the strength thereof. Further, each vane element defines a plane of symmetry intermediate the major planar surfaces thereof and a leading edge cross-sectional configuration which is non-symmetrical relative to the associated plane of symmetry and preferably which is substantially uniform and defines a flow stagnation line which is off-set from the plane of symmetry. Corresponding vane elements, extending in generally diametrically opposite directions from the hub and having aligned planes of symmetry, have flow stagnation lines which are offset in a common direction from the aligned, respective planes of symmetry; alternatively, adjacent pairs of equiangularly displaced vane elements may have oppositely directed such offsets, commonly for all such pairs.

6 Claims, 7 Drawing Sheets

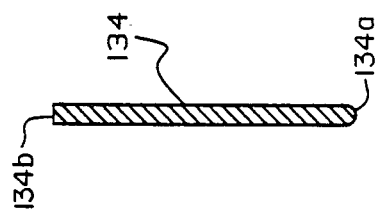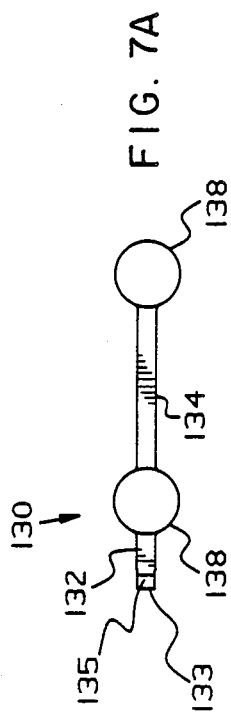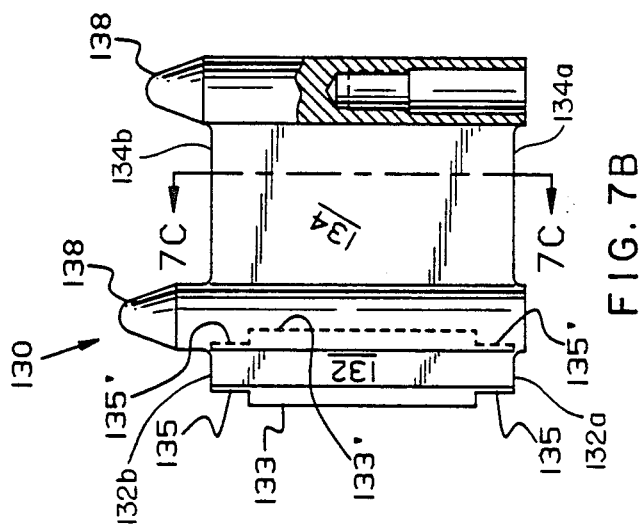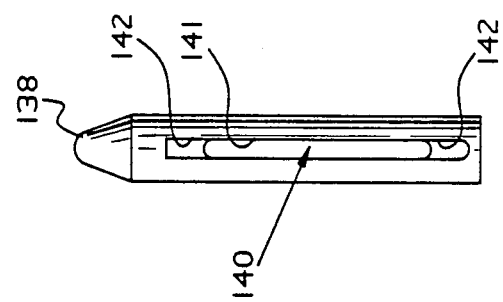

ROD CLUSTER HAVING IMPROVED VANE CONFIGURATION

CROSS-REFERENCE TO RELATED APPLICATION

This application is a continuation-in-part of U.S. application Ser. No. 806,722 filed Dec. 9, 1985 now abandoned having the same title and inventor-applicants as herein and is assignable to the same assignee as therein, Westinghouse Electric Corp.

BACKGROUND OF THE INVENTION

1. Field of the Invention

This invention relates to pressurized water reactors and, more particularly, to a spider, for mounting and adjustable positioning of rod clusters, having an improved vane configuration which mitigates flow-induced vibration responses while increasing the load carrying capability of the spider vanes and decreasing the manufacturing cost thereof.

2. State of the Relevant Art

As is well known in the art, conventional pressurized water reactors employ a number of control rods which are mounted within the reactor vessel, generally in parallel axial relationship, for axial translational movement in telescoping relationship with the fuel rod assemblies. The control rods contain materials known as poisons, which absorb neutrons and thereby lower the neutron flux level within the core. Adjusting the positions of the control rods relative to the respectively associated fuel rod assemblies thereby controls and regulates the reactivity and correspondingly the power output level of the reactor. Typically, the control rods, or rodlets, are arranged in clusters, and the rods cf each cluster are mounted to a common, respectively associated spider. Each spider, in turn, is connected to a respectively associated adjustment mechanism for raising or lowering the associated rod cluster.

In certain advanced designs of such pressurized water reactors, there are employed both control rod clusters (RCC) and water displacer rod clusters (WDRC), and also so-called gray rod clusters which, to the extent here relevant, are structurally identical to the RCC's and therefore both are referred to collectively hereinafter as RCC's. In one such reactor design, a total of over 2800 reactor control rods and water displacer rods are arranged in 185 clusters, each of the rod clusters having a respectively corresponding spider to which the rods of the cluster are individually mounted.

In the exemplary such advanced design pressurized water reactor, there are provided, at successively higher, axially aligned elevations within the reactor vessel, a lower barrel assembly, an inner barrel assembly, and a calandria, each of generally cylindrical configuration, and an upper closure dome. The lower barrel assembly has mounted therein, in parallel axial relationship, a plurality of fuel rod assemblies which are supported at the lower and upper ends thereof, respectively, by corresponding lower and upper core plates, the latter being welded to the bottom edges of the cylindrical sidewall of an inner barrel assembly. Within the inner barrel assembly there are mounted a large number cf rod guides disposed in closely spaced relationship, in an array extending substantially throughout the cross-sectional area of the inner barrel assembly. The rod guides are of first and second types, respectively housing therewithin reactor control rod clusters (RCC) and water displacer rod clusters (WDRC); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower, overall fuel costs. Consistent with this objective, the water displacement rodlet clusters (WDRC's) function as a mechanical moderator control, all of the WDRC's being fully inserted into association with the fuel rod assemblies, and thus into the reactor core, when initiating a new fuel cycle. Typically, a fuel cycle is of approximately 18 months, following which the fuel must be replaced. As the excess reactivity level diminishes over the cycle, the WDRC's are progressively, in groups, withdrawn from the core so as to enable the reactor to maintain the same reactivity level, even though the reactivity level of the fuel rod assemblies is reducing due to dissipation over time. Conversely, the control rod clusters are moved, again in axial translation and thus telescoping relationship relatively to the respectively associated fuel rod assemblies, for control of the reactivity and correspondingly the power output level of the reactor on a continuing basis, for example in response to load demands, in a manner analogous to conventional reactor control operations.

The calandria includes a lower calandria plate and an upper calandria plate. The rod guides are secured in position at the lower and upper ends thereof, respectively, to the upper core plate and the lower calandria plate. Within the calandria and extending between aligned apertures in the lower and upper plates thereof is mounted a plurality of calandria tubes in parallel axial relationship, respectively aligned with the rod guides. A number of flow holes are provided in remaining portions of the calandria plates, at positions displaced from the apertures associated with the calandria tubes, through which the reactor core outlet flow passes as it exists from its upward passage through the inner barrel assembly. The core outlet flow, or a major portion thereof, turns from the axial flow direction to a radial direction for passage through radially outwardly oriented outlet nozzles which are in fluid communication with the calandria.

In similar parallel axial and aligned relationship, the calandria tubes are joined to corresponding flow shrouds which extend to a predetermined elevation within the dome, and which in turn are in alignment with and in close proximity to corresponding head extensions which pass through the structural wall of the dome and carry, on their free ends at &.he exterior of and vertically above the dome, corresponding adjustment mechanisms, as above noted. The adjustment mechanisms have corresponding drive rods which extend through the respective head extensions, flow shrouds, and calandria tubes and are connected to the respectively associated spiders to which the clusters of RCC rods and WDRC rods are mounted, and serve to adjust their elevational positions within the inner barrel assembly and, correspondingly, the level to which the rods are lowered into the lower barrel assembly and thus into association with the fuel rod assemblies therein, thereby to control the reactivity within the core.

A critical design criterion of such reactors is to mitigate vibration of the reactor internals structures, as may be induced by the core outlet flow as it passes through the reactor internal structures. A significant factor for achieving that criterion is to maintain the core outlet flow or an axial direction throughout the inner barrel assembly and thus in parallel axial relationship relatively to the rod clusters and associated rod guides. This is achieved, in part, by the location of the water inlet and outlet nozzles at an elevation corresponding approximately to that of the calandria assembly, and thus above the inner barrel assembly which houses the rod guides and associated rod clusters, as above noted. Additionally, structural elements known as formers are included within the vessel to assist in maintaining the desired axial flow condition within the inner barrel assembly, in accordance with the invention disclosed in the copending application entitled "MODULAR FORMER FOR INNER BARREL ASSEMBLY OF PRESSURIZED WATER REACTOR"—Gillett et al., Ser. No. 798,195 filed Nov. 14, 1985 and assigned to the common assignee hereof now U.S. Pat. No. 4,752,441, issued June 21, 1988.

It has been determined, however, that the conventional configuration of rod cluster spiders renders them susceptible to flow-induced vibrations, even though the desired axial flow condition is maintained. Such a circumstance is of extreme concern, since vibrations accelerate the rate of wear of the internals structural elements, including particularly the rods and associated, supporting structures, leading to shortened life of these structural components and increased maintenance expense in the operation of the reactor.

Conventional reactor designs do not incorporate a reactor coolant flow path that results in the spider vanes being subjected to the bulk flow field; instead, the flow paths generally direct the coolant flow radially outwardly (i.e., from an axial path) prior to the flow reaching the normal elevation, or axial operating position, of the spiders. Accordingly, conventional reactor internals have no structural analogy to the dense packing of rod guides and associated rod clusters as are employed in advanced reactor designs of the type herein contemplated nor do they have any similar flow path requirements as exist therein, and thus they do not present the critical design concerns relating to flow-induced vibration of the spider vanes, as above explained. Thus, there are no known solutions to these problems, consistent with the structural and operational requirements of, and taking into account the environmental factors which exist in, advanced design reactors as hereinabove set forth.

SUMMARY OF THE INVENTION

As before noted, a pressurized water nuclear reactor, of the type with which rod cluster spiders having the improved vane configuration of the present invention are intended for use, employs a large number of control rods, or rodlets, typically arranged in what are termed reactor control rod clusters (RCC) and, additionally, a large number of water displacer rods, or rodlets, similarly arranged in water displacer rod clusters (WDRC), an array of 185 such clusters containing a total of 2800 rodlets (i.e., the total of reactor control rods and water displacer rods) being mounted in parallel axial relationship within the inner barrel assembly of the reactor vessel. The rods of each cluster are mounted at their upper ends to a corresponding spider, and the spider-mounted cluster is received in telescoping relationship within a corresponding rod guide. The spider is connected through a drive rod to a corresponding adjustment mechanism, which provides for selectively raising or lowering the rod cluster relatively to an associated group of fuel rod assemblies, to control the reactivity, and thus the power output level of the reactor.

While the design of such advanced reactors has addressed the achievement of a substantially axial core outlet flow, particularly through the upper internals and thus past the rod guides and associated clusters of rods, it has been determined that the configuration of the conventional spider vanes which support the rods may be susceptible to undesired vibrations; specifically, the conventional configuration of the generally radially extending vanes is not optimum, and thus does not satisfy the design criterion of mitigating vibrations.

More particularly, the spider configuration typically comprises a central hub of generally cylindrical configuration, extending in parallel axial relationship relative to the vertical axis of the vessel. Vane assemblies are connected to and extend radially from the central hub, the vane assemblies being of differing configurations but generally comprising vertically oriented vanes, comprising metal sheets, having generally parallel, planar major surfaces, which interconnect two or more cylindrical rod support mounts to each other and to the hub. The rod support mounts as well extend in parallel axial relationship with the hub. The core outlet flow thus passes along the vanes in a parallel flow condition, consistent with the general design criterion of maintaining parallel axial flow.

Each spider, and thus its associated vane assemblies, must be of considerable structural strength. For example, a control rod spider typically supports a total of eight control rods, disposed equiangularly about the central hub on four radially extending vane subassemblies; the total weight of the control rod cluster of eight rods is approximately 200 lbs. to 250 lbs. A typical water displacer rod cluster may comprise up to 24 water displacer rods mounted in alternating groups of two and four rods on corresponding ones of a total of eight vane assemblies, each of the four-rod assemblies including both a radially extending vane element and a pair of transversely extending vane elements, the latter carrying the cylindrical support mounts at their outer extremities. The total weight of a water displacer rod cluster, thus configured, is approximately 700 lbs. to 800 lbs. The spiders must support not only the dead weight of the respective rod clusters, but additionally must accommodate the forces imposed thereon both by the environment of the relatively fast-moving core outlet flow which passes thereover and the rod height adjustment functions.

Thus, the configuration of the spiders must afford significant structural support while mitigating susceptibility to flow-induced vibrations. Particularly, in accordance with the present invention, it has been determined that the respective cross-sectional configurations of both the leading and trailing edges of the spider vanes, relative to the flow thereover, may have a pronounced effect on the susceptibility of the spider vanes to flow-induced vibrations and on oscillatory rotational torques to which the spider is subjected. More specifically, it has been determined that a vane configuration having a trailing edge of substantially square cross-section relative to the flow thereover optimizes structural strength while mitigating susceptibility thereof to flow-induced vibrations; further, this trailing edge configuration minimizes the cost of manufacture. Additionally, in accordance with the present invention, it has been recognized that within a small range of axial locations of the spider, at which the vanes pass through corresponding channels provided therefor in the support plates within the rod guides, the flow restrictions thus created result in considerable flow-induced random buffeting of the vanes, which become ordered on the vanes and result in a switching, or oscillatory loading (which may be a lateral force and/or a torque) being applied to the spider and the control rods supported thereby as well as to the associated drive mechanism. In accordance with the present invention, it has been determined that a major factor in the initiation of phenomenon of the switching, or oscillatory loading, is the typical symmetrical configuration of the vane leading edge cross-section. For example, as is typical and consistent with conventional design criteria, the vane leading edge configuration is of a semicircular or other symmetrical type cross-section. In accordance with the present invention, however, it has been determined that the proper configuration for the cross-section of the vane leading edge should be non-symmetrical, thereby to eliminate the switching or oscillatory loading and correspondingly to mitigate the vibratory load conditions. Based on various operational parameters, a number of different non-symmetrical cross-sections are available, as disclosed in more detail hereinafter.

BRIEF DESCRIPTION OF THE DRAWINGS

FIGS. 7a, 7b and 7c are top plan and side elevational views of an exemplary radial vane assembly, the latter partially broken-away in cross-section;

FIG. 8 is an elevational view of an individual rod support mount of the type employed in the spiders of the foregoing figures;

DETAILED DESCRIPTION OF THE PREFERRED EMBODIMENT

Figure 1A:
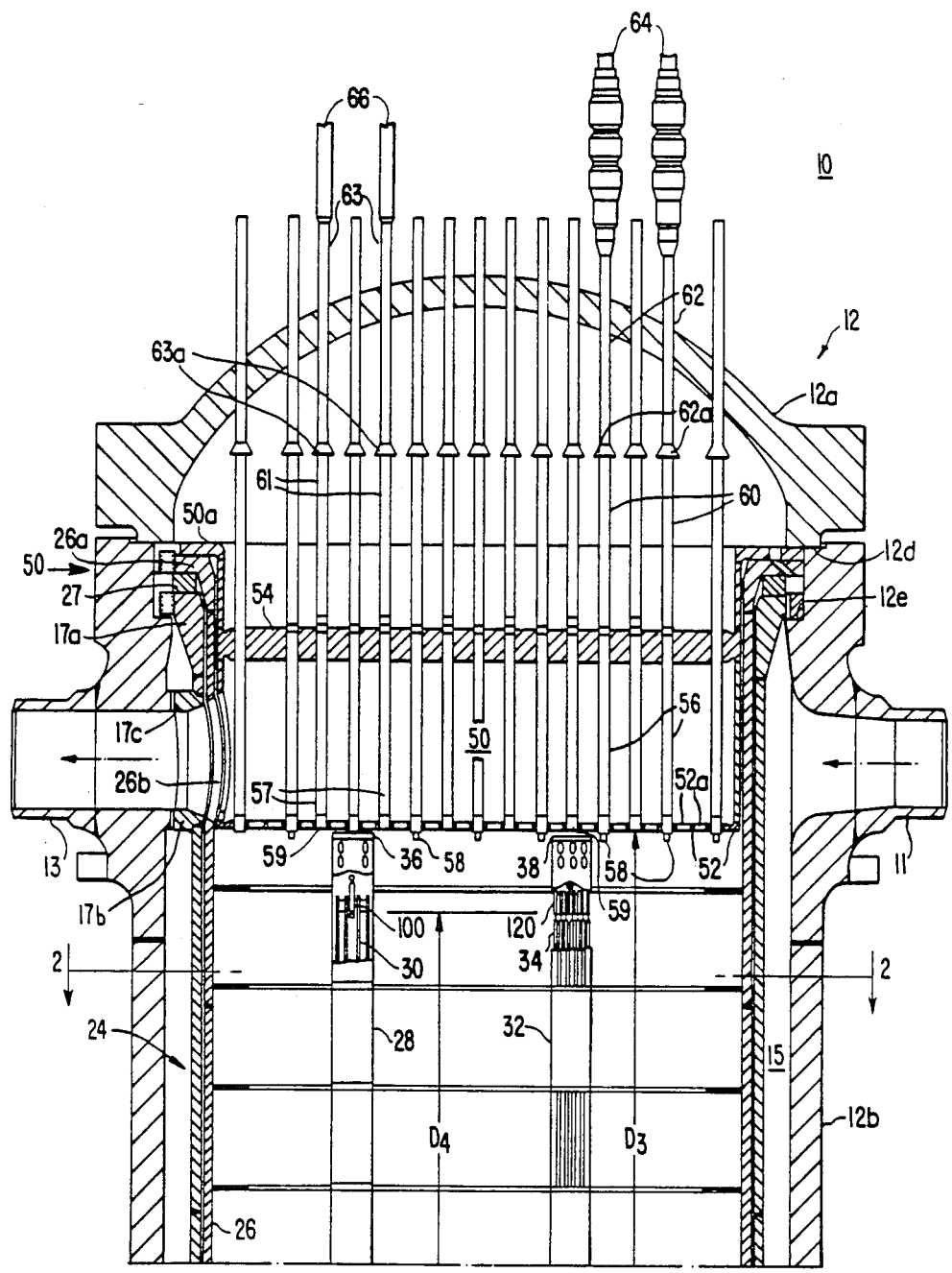
FIG. 1A and 1B are an elevational view, partially in cross-section, of a pressurized water reactor of the type with which a rod cluster spider having the improved vane configuration in accordance with the present invention is intended to be employed.

The composite of FIGS. IA and IB (referred to hereinafter as FIG. 1) is an elevational view, partly in cross-section, of a pressurized water reactor 10 comprising a vessel 12 including an upper dome, or head assembly, 12a, cylindrical sidewalls 12b, and a bottom closure 12c comprising the base of the reactor 10. Plural radially oriented inlet nozzles 11 and outlet nozzles 13 (only one (1) of each appearing in FIG. 1) are formed in the sidewall 12b, adjacent the upper, annular end surface 12d of the sidewall 12b. Whereas the cylindrical sidewall 12b may be integrally joined, as by welding, to the bottom closure 12c, the head assembly 12a is removably received on the upper, annular end surface 12d of the sidewall 12b and secured thereto. The sidewall 12b further defines an inner, generally annular mounting ledge 12e for supporting various internals structures, as later described. Within the bottom closure 12c, as schematically indicated, is so-called bottom-mounted instrumentation 13.

The lower barrel assembly 16 comprises a generally cylindrical sidewall 17 affixed at its lower end to a lower core plate 18, which is received on mounting support 18b, as generally schematically illustrated. The cylindrical sidewall 17 extends substantially throughout the axial height of the vessel 12 and includes an annular mounting ring 17a at the upper end thereof which is received on the annular mounting ledge 12e thereby to support the assembly 16 within the vessel 12. As will be rendered more apparent hereafter, the sidewall 17 is solid in the vicinity of the inlet nozzles 11, but includes an aperture 17b having a nozzle ring 17c mounted therein which is aligned with and removably secured to the outlet nozzle 13. An upper core plate 19 is supported on a mounting support 17d affixed to the interior surface of the cylindrical sidewall 17 at a position approximately one-half the axial height thereof. Fuel rod assemblies 20 are positioned in generally vertically oriented, parallel axial relationship within the lower barrel assembly 16 by bottom mounts 22 carried by the lower core plate 18 and by pin-like mounts 23 carried by, and extending through, the upper core plate 19. Flow holes 18a and 19a (only two of which are shown in each instance) are provided in predetermined patterns, extending substantially throughout the areas of the lower and upper core plates 18 and 19, the flow holes 18a permitting passage of a reactor coolant fluid into the lower barrel assembly 16 in heat exchange relationship with the fuel rod assemblies 20 defining the reactor core, and the flow holes 19a permitting passage of the core output flow into the inner barrel assembly 24. A neutron reflector and shield 21 is mounted interiorly of the cylindrical sidewalls 17, in conventional fashion.

Figure 1B:
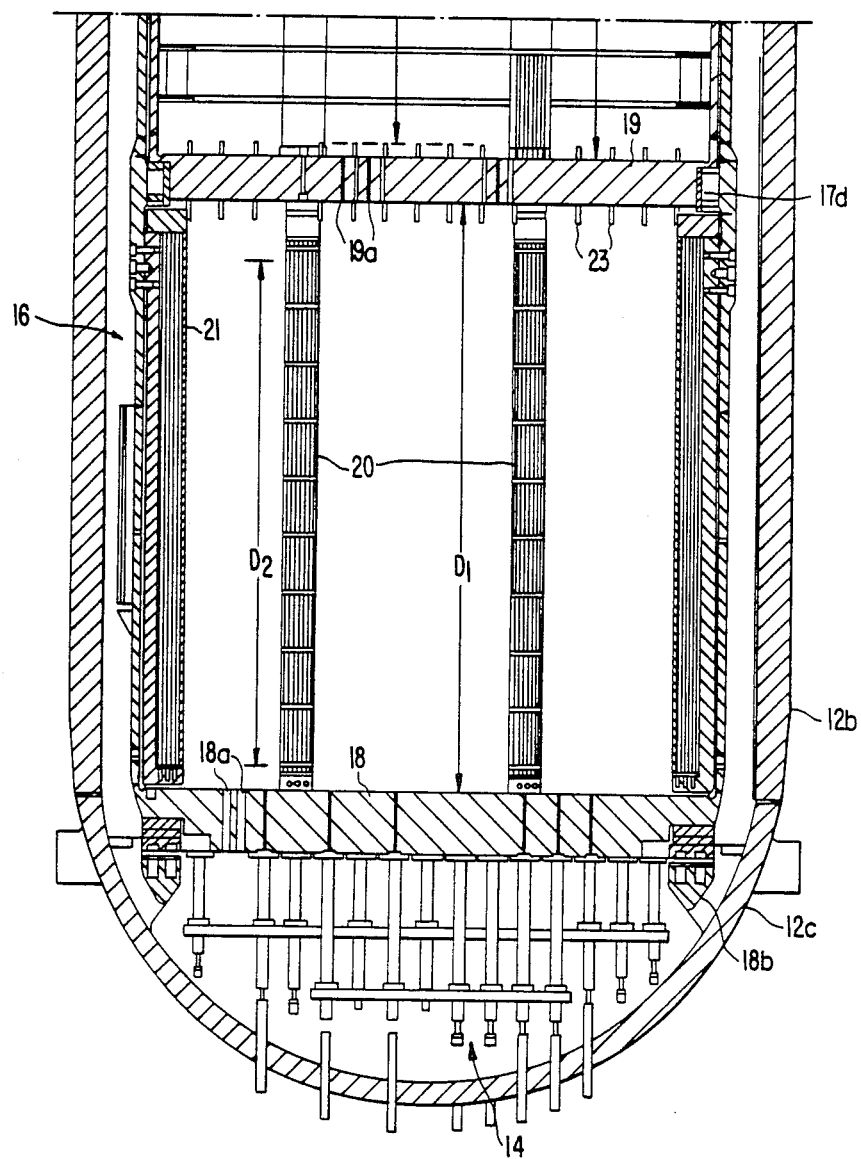

The inner barrel assembly 24 includes a cylindrical sidewall 26 which is integrally joined at its lower edge to the upper core plate 19. The sidewall 26 has secured to its upper, open end, an annular mounting ring 26a which is received on an annular hold-down spring 27 and supported along with the mounting ring 17a on the mounting ledge 12e. The sidewall 26 further includes an aperture 26b aligned with the aperture 17b and the output nozzle 13. Within the inner barrel assembly 24, and densely packed within the cylindrical sidewall 26, are positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guide 32 housing a cluster of water displacement rods 34 (WDRC). The rods of each RCC cluster 30 and of each WDRC cluster 34 are mounted individually to the respectively corresponding spiders 100 and 120. Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50, and particularly to a lower calandria plate 52.

The calandria assembly 50 includes, in addition to the lower calandria plate 52, an upper calandria plate 54 and a plurality of parallel axial calandria tubes 56 and 57 which are positioned in alignment with corresponding apertures in the lower and upper calandria plates 52 and 54 and to which the calandria tubes 56 and 57 are mounted at their respective, opposite ends. More specifically, calandria extensions 58 and 59 extend through corresponding apertures in and are secured to the lower calandria plate 52, and the corresponding calandria tubes 56 and 57 are respectively secured to the extensions 58 and 59. Similar structures connect the upper ends of the calandria tubes 56 and 57 to the upper calandria plate 54.

For the specific configurations of the respective calandria extensions 58 and 59 as illustrated, only the calandria extensions 58 project downwardly from the lower calandria plate 52 and connect to corresponding mounting means 36 for the upper ends, or tops, of the RCC rod guides 28. The upper end mounting means 38, associated with the WDRC rod guides 32, may be interconnected by flexible linkages to the mounting means 36 of the RCC rod guides 28, in accordance with the invention of the pending application, entitled: "FLEXIBLE ROD GUIDE SUPPORT STRUCTURE FOR INNER BARREL ASSEMBLY OF PRESSURIZED WATER REACTOR"-Gillett et al., Ser. No. 798,220 filed Nov. 14, 1985 and assigned to the common assignee hereof. Alternatively, the WDRC rod guides 32 may be connected independently to the lower calandria plate 52 by the top end support structure of the invention disclosed in the copending application, entitled: "TOP END SUPPORT FOR WATER DISPLACEMENT ROD GUIDES OF PRESSURIZED WATER REACTOR"-Sherwood et al., Ser. No. 798,194 filed Nov. 14, 1985 and assigned to the common assignee hereof now U.S. Pat. No. 4,707,331, issued Nov. 17, 1987. In the latter instance, the calandria extensions 59 likewise project downwardly from the plate 52, similarly to the extensions 58, to engage and laterally support the WDRC mounting means 38.

Extending upwardly beyond the upper calandria plate 54 and, more particularly, within the head assembly 12a of the vessel 12, there are provided plural flow shrouds 60 and 61 respectively aligned with and connected to the plural calandria tubes 56 and 57. A corresponding plurality of head extensions 62 and 63 is aligned with the plurality of flow shrouds 60, 61, the respective lower ends 62a and 63a being flared, or bell-shaped, so as to facilitate assembly procedures and, particularly, to guide the drive rods (not shown in FIG. 1) into the head extensions 62, 63 as the head assembly 12a is lowered onto the mating annular end surface 12d of the vessel sidewall 12b, as later explained in reference to FIGS. 9A and 9B. The flared ends 62a, 63a also receive therein the corresponding upper ends 60a, 61a of the flow shrouds 60, 61 in the completed assembly, as seen in FIG. 1. The head extensions 62, 63 pass through the upper wall portion of the head assembly 12a and are sealed thereto. Control rod cluster (RCC) displacement mechanisms 64 and water displacement rod cluster (WDRC) displacement mechanisms 66 are associated with the respective head extensions 62, 63, flow shrouds 60, 61 and calandria tubes 56, 57 which, in turn, are associated with respective clusters of radiation control rods 30 and water displacement rods 34. The RCC displacement mechanisms (CRDM's) 64 may be of well known type, as are and have been employed with conventional reactor vessels. The displacer rod drive mechanisms (DRDM's) 66 for the water displacer rod clusters (WDRC's) 34 may be in accordance with the disclosure of U.S. Letters Pat. No. 4,439,054—Veronesi, assigned to the common assignee hereof.

The respective drive rods associated with the CRDM's 64 and the DRDM's 66 are structurally and functionally the equivalent of an elongated, rigid rod extending from and in association with the respective CRDM's 64 and DRDM's 66 to the respective clusters of radiation control rods (RCC's) and water displacements rods (WDRC's) 30 and 34 and particularly, are connected at their lower ends to the spiders 100 and 120. The CRDM's and DRDM's 64 and 66 thus function through the corresponding drive rods to control the respective vertical positions of, and particularly, selectively to lower and/or raise, the RCC's 30 and the WDRC's 34 through corresponding openings (not shown) provided therefore in the upper core plate 19, telescopingly into or out of surrounding relationship with the respectively associated fuel rod assemblies 20.

In this regard, the interior height $D_1$ of the lower barrel assembly 16 is approximately 178 inches, and the active length $D_2$ of the fuel rod assemblies 20 is approximately 153 inches. The interior, axial height $D_3$ is approximately 176 inches, and the extent of travel, $D_4$, of the rod clusters 30 and 34 is approximately 149 inches. It follows that the extent of travel of the corresponding CRDM and DRDM drive rods is likewise approximately 149 inches.

While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement which is achieved by selective positioning of the water displacement rod clusters 34. It is significant, however, that the RCC's 30 are adjusted in position relatively frequently, compared to the WDRC's 34, to achieve the desired power output level from the reactor. Conversely, the WDRC's 34, initially, are lowered, or inserted, fully into the lower barrel assembly 16 at the initiation of each fuel cycle. The WDRC's 32, through their respective drive rods (not shown in FIG. 1) and DRDM's 66, then are selectively removed as the excess reactivity is depleted, over the fuel cycle. Typically, this is performed by simultaneously removing a group of four such WDRC's 34 from their fully inserted positions in association with the fuel rod assemblies 20, to a fully raised position within the corresponding WDRC guides 32 and thus within the inner barrel assembly 24, in a continuous and controlled withdrawal operation. More specifically, the four WDRC's 34 of a given group are selected so as to maintain a symmetrical power balance within the reactor core, when the group is withdrawn. Typically, all of the WDRC's 34 remain fully inserted in the fuel rod assemblies 20 for approximately 60% to 70% of the approximately 18 month fuel cycle. Groups thereof then are selectively and successively moved to the fully withdrawn position as the excess reactivity is depleted, so as to maintain a nominal, required level of reactivity which can sustain the desired output power level, under control of the variably adjustable RCC's 30.

The reactor coolant fluid, or water, flow through the vessel 10 proceeds generally from a plurality of inlet nozzles 11, one of which is seen in FIG. 1, downwardly through the annular chamber between an outer generally cylindrical surface defined by the interior surface of the cylindrical sidewall 12b of the vessel 12 and an inner generally cylindrical surface defined by the cylindrical sidewall 17 of the lower barrel assembly 16. The flow then reverses direction and thereafter passes axially upwardly through flow holes 18a in the lower core plate 18 and into the lower barrel assembly 16, from which it exits through a plurality of flow holes 19a in the upper core plate 19 to pass into the inner barrel assembly 24, continuing in parallel axial flow therethrough and finally exiting upwardly through flow holes 52a in the lower calandria plate 52. Thus, parallel axial flow conditions are maintained through both the lower and inner barrel assemblies 16 and 24. Within the calandria 50, the flow in general turns through 90°. to exit radially from a plurality of outlet nozzles 13 (one of which is shown in FIG. 1). The reactor coolant flow proceeds as well into the chamber defined by the head assembly 12a through certain bypass passageways (not shown in FIG. 1), associated with the mounting of the calandria tubes 56 and 57 to the upper calandria plate 54 and also in accordance with the connections of the head extensions 62, 63 and the flow shrouds 60, 61. The flared ends 62a and 63a of the corresponding head extensions 62, 63 which function to guide the corresponding flow shrouds 60, 61 into alignment during assembly of the head assembly 12a with the sidewall 12b to achieve the assembled relationship illustrated in FIG. 1. The pressure of the cycle water, or reactor coolant, within the vessel 10 typically is in the range of about 2,250 psi, and provides the energy source, or fluid pressure, to the DRDM's 66 for raising the DRDM drive rods from a fully inserted to a fully withdrawn, or up position, as described more fully in the related, above-identified patent. As is apparent from FIG. 1, therefore, the spiders 100 and 120 are continuously subjected to the cycle water, or reactor coolant of the core outlet flow as it passes in substantially a parallel axial flow condition through the inner barrel assembly 24.

Figure 2:
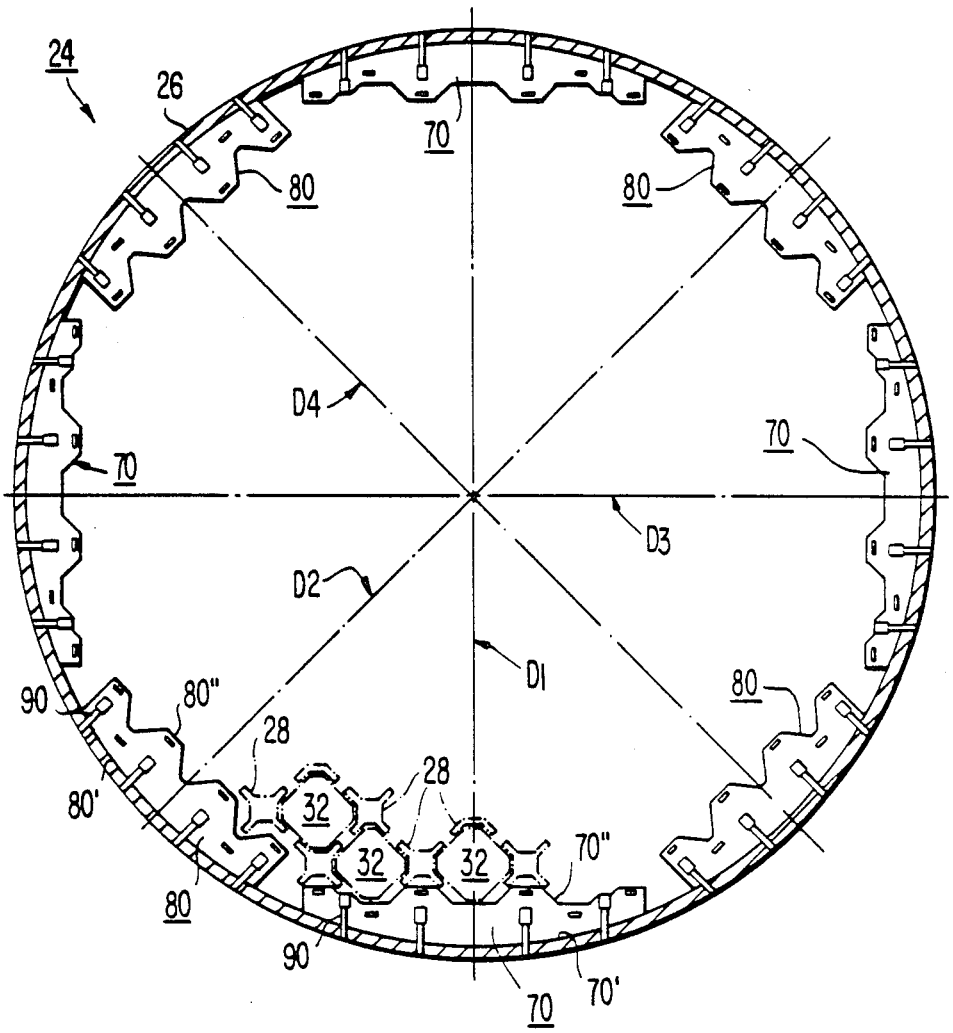
FIG. 2 is a simplified, or schematic, cross-sectional view, taken along the line 2—2 in FIG. 1, illustrating the relatively dense packing of water displacer rod clusters and control rod clusters and their associated rod guides within the inner barrel assembly of the reactor vessel of FIG. 1.

FIG. 2 is a cross-sectional, schematic view, taken along the line 2-2 in FIG. 1, of the inner barrel assembly 24, and serves to illustrate diagrammatically the dense packing of the arrays of plural control rod clusters (RCC's) 30 and water displacer rod clusters (WDRC's) within the inner barrel assembly 24. For ease of illustration, only the immediately surrounding, cylindrical sidewall 26 of the inner barrel assembly 24 is shown, the sidewalls 16 and 12b being omitted; as well, FIG. 2 illustrates only a general outline of the periphery of the RCC and WDRC rod guides 28 and 32 within which the corresponding RCC and WDRC rods are housed, as seen in FIG. 1. As is readily visualized from FIGS. 1 and 2, the RCC clusters 30 and WDRC clusters 34 are disposed in interleaved arrays, substantially across the entire cross-sectional area of the inner barrel assembly 24. This dense packing of the respective rod clusters and associated spiders thus requires careful design to assure not only that parallel flow is maintained throughout, but also that flow induced vibrations and concomitant deleterious force effects are mitigated, to the extent possible.

In accordance with the above-noted invention relating to modular formers, the elevational view of FIG. IA shows three vertical banks 40, 42 and 44 of modular formers of which the middle bank 42 is seen in FIG. 2; since the banks 40, 42 and 44 are identical in construction, with the exception of their respective vertical height dimensions, the view of FIG. 2 is illustrative as well of the banks 40 and 44 and additionally, of both top and bottom plan views of each thereof. Particularly, the modular formers are of two different configurations shown at 70 and 80, respectively disposed symmetrically about quadrature-related diameters D1 and D3, and D2 and D4 and thus in an alternating succession at 45. angular segments. Attachment elements 90 secure the formers 70 and 80 to the sidewall 26, the outer edges 70' and 80' thereof comprising arcuate segments mating the interior circumference of the sidewall 26 so as to be received thereagainst in mating relationship, and the inner edges 70" and 80" having configurations mating the periphery of the interleaved arrays of the RCC and WDRC rod guides 28 and 32.

Figure 3:
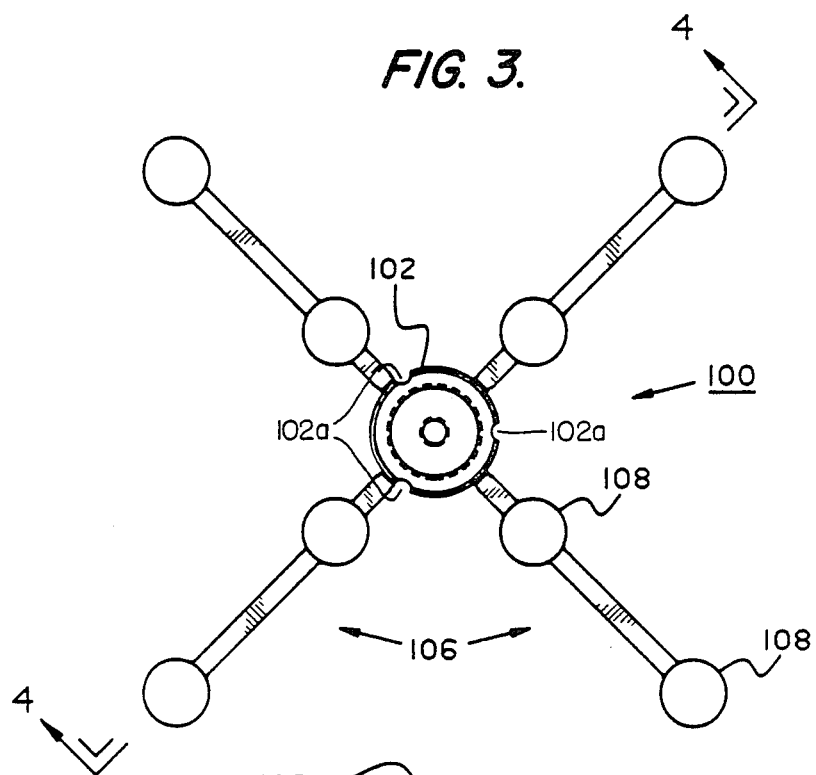
FIG. 3 is a plan view of an RCC spider.
Figure 4:
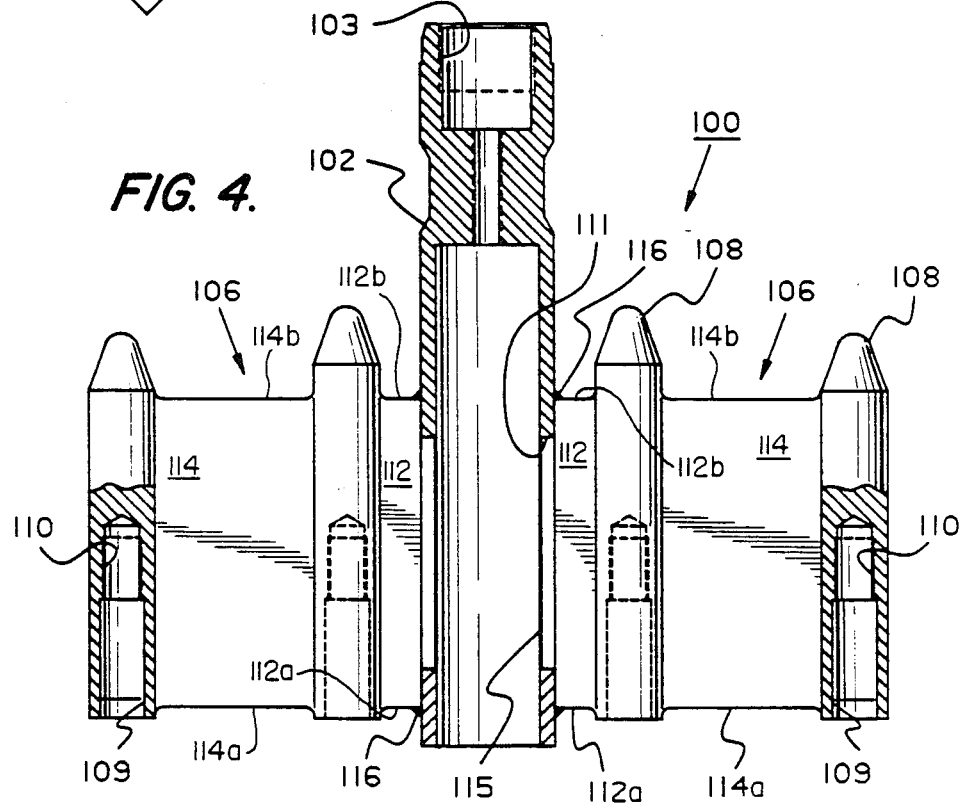
FIG. 4 is an elevational view, partially in cross-section, of the RCC spider of FIG. 3, taken along the line 4—4 in FIG. 3.

FIGS. 3 and 4 are plan and elevational views of an RCC spider 100, FIG. 3 being schematic in form and FIG. 4 being a partly broken-away, cross-sectional view taken along the line 4-4 in FIG. 3. The RCC spider 100 comprises a central hub 102 of generally cylindrical configuration having an upper, interiorly threaded end 103 for connection to a drive rod (not shown) which extends, as before described, upwardly to an RCC adjustment mechanism 64 by which the spider 100 and its associated control rods (not shown) may be vertically adjusted in position within and relative to the RCC rod guide 28. Recesses 102a provide for locking a metal protective sleeve (not shown in FIG. 3) which surrounds and overlaps the joint between the drive rod (not shown) and the hub 102, by indenting same into recesses 102a. This construction is shown in further detail in the concurrently filed application entitled "PRESSURIZED WATER REACTOR HAVING DISCONNECTABLE TWO-PIECE DRIVE ROD ASSEMBLIES, AND RELATED METHODS OF ASSEMBLY AND MAINTENANCE OPERATIONS"-Altman et al., Ser. No. 806,711 filed Dec. 9, 1985 and assigned to the common assignee hereof now U.S. Pat. No. 4,778,645, issued Oct. 18, 1988. Vane assemblies 106 are secured at the respective inner edges thereof to the hub 102 and extend radially therefrom in quadrature, relative relationship. Each vane assembly 106 includes a pair of cylindrical support mounts 108, each thereof having an interior bore 109 including an interiorly threaded portion 110 into which the upper, correspondingly threaded end of a control rod (not shown) is threadingly engaged so as to be supported by the vane assembly 106 and corresponding hub 102.

Figure 5:
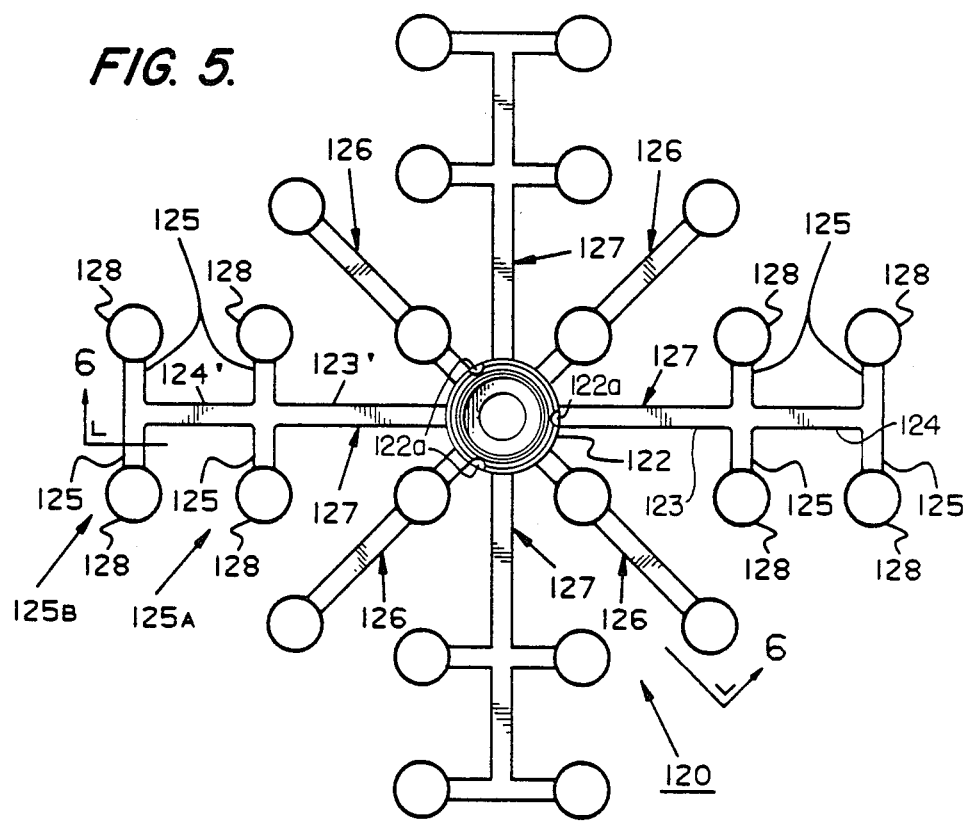
FIG. 5 is a plan view of a WDRC spider.
Figure 6:
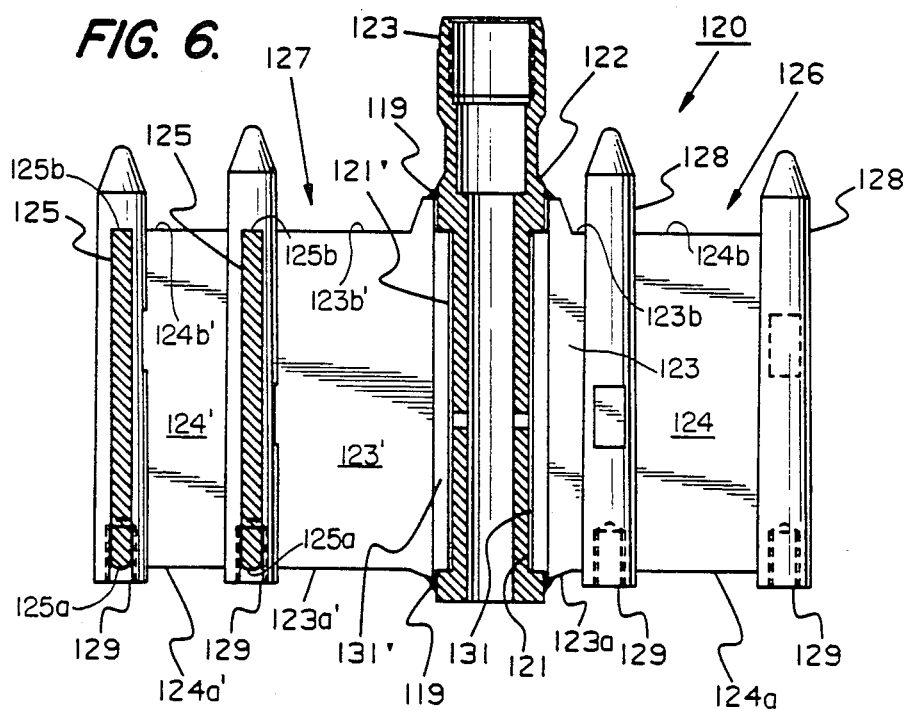
FIG. 6 is an elevational view, partially in cross-section, of the WDRC spider of FIG. 5, taken along the line 6—6 in FIG. 5.

FIGS. 5 and 6 illustrate a WDRC spider 120, FIG. 5 being a planar, generally schematic view, and FIG. 6 being an elevational view, partially in cross-section and taken along the line 6—6 in FIG. 5. Similarly to the RCC spider 100, the WDRC spider 120 includes a central hub 122 of generally cylindrical configuration, the upper end 123 being interiorly threaded to receive a drive rod which, as discussed in connection with FIG. 1, connects to a corresponding WDRC control mechanism 66. Recesses 122a are provided for the same purpose as recesses 102a in the hub 102 of FIGS. 3 and 4, as above noted. First and second types of vane assemblies 126, 127 are connected to the hub 122 in alternating, equiangularly displaced relationship so as to extend radially therefrom. The vane assemblies 126 are substantially similar to the RCC vane assemblies 106, as seen in FIGS. 3 and 4, and thus include a pair of radially displaced WDRC rod support mounts 128. As best seen from FIG. 5, the vane assemblies 126 are disposed to extend radially from the hub 122 in quadrature relationship. The vane assemblies 127 include integral, transverse vanes 125 extending as first and second oppositely oriented pairs 125A and 125B from the radially extending, planar vane portions 123' and 124' of the assembly 127 and each thereof carrying a WDRC rod support mount 128 at its extremity. As best seen in FIG. 5, four vane assemblies 127 of the second type are disposed to extend radially from the hub 122 in mutual, quadrature relationship, each intermediate an adjacent quadrature-related pair of vane assemblies 106 in the alternating sequence as above described. Each of the WDRC rod support mounts 128 includes a threaded bore 129 at its lower extremity for receiving, in threaded engagement therein, the top end of a corresponding WDRC rod.

The configuration of the vane assemblies 106 and 126 is described more specifically in relation to an illustrative, or exemplary, vane assembly 130 shown in FIGS. 7a, 7b and 7c in top plan, side elevation, and cross-sectional views, respectively, the latter taken along the lines 7c-7c in FIG. 7b. The vane assembly 130 is directly representative of either of the vane assemblies 106 and 126 in FIGS. 3 through 6. The vane assembly 130 includes first and second planar vane elements 132 and 134, the latter interconnecting the radially inner and outer rod support mounts 138, and the former connecting the inner rod support mount 138 to the hub of the associated spider, for example, the hub 102 of FIGS. 3 and 4 and the hub 122 of FIGS. 5 and 6. The first planar vane element 132 furthermore is machined to include on its radially inward and radially outward longitudinal edges, respectively, flanges 133 and 133' of reduced thickness and upper and lower stepped portions 135 and 135'. It is to be understood that the designation of a "planar vane element" or "planar vane element portion" as used herein is intended to describe a sheetlike structure, typically of metal, and having parallel, planar major surfaces, substantially as shown.

With concurrent reference to FIGS. 7a, 7b, and FIG. 8, the illustrative rod support mount 138 includes a receiving slot 140 for receiving the flange 133 and upper and lower recessed portions 142 for receiving the corresponding upper and lower stepped portions 135 (135') of the flange 132. It is to be understood that the illustrative, second planar vane element 134 includes corresponding flanges on its longitudinal edges for interconnection of the inner and outer rod elements 138.

The vane assembly 130 of FIGS. 7a and 7b will be seen to correspond substantially identically to the RCC vane assembly 106 of FIGS. 3 and 4 and the WDRC vane assembly 126 of FIGS. 5 and 6. Accordingly, the vane assemblies 106 and 126 include corresponding first and second planar vane elements 112 and 114 and 123 and 124, respectively, each thereof having longitudinal flanges corresponding to the flange 133 in FIG. 7b for connecting the associated vane assembly 106 and 126 to the respective, RCC spider hub 102 and WDRC spider hub 122. This structure is illustrated for the RCC spider 100 in FIG. 4 by the receiving slot 111 in the hub 102 and the flange 115 received therein, and is illustrated for the WDRC spider 120 in FIG. 6 by the receiving slot 121 in the hub 122 and the flange 131 associated with the first planar vane element 123, received therein.

The second type of vane assembly 127 of the WDRC spider 120, as seen in FIG. 6, corresponds substantially to the first vane assembly 126 in that it includes first and second planar vane element portions 123' and 124' which are integrally formed and extend radially from the hub 122, the first portion 123' having a longitudinal flange 131' received in a corresponding receiving slot 121' in the hub 122. The assembly 127 furthermore includes first and second pairs 125A and 125B of third planar vane elements 125 integrally formed with and extending transversely from the first and second vane element portions 123' and 124', the first pair 125A being formed intermediate the portions 123' and 124' and the second pair 125B being formed on the outer longitudinal edge of the second vane element portion 124'. Each of the elements 125 carries a rod support mount 128 on its outer longitudinal edge. It will be understood that the third, or transverse, planar vane elements 125 may include similar flange structures on their outer longitudinal edges for mounting the corresponding rod support mounts 128.

In assembling the respective RCC and WDRC spiders 102 and 120, the innermost planar vane elements 112, and 123, 123' preferably are positioned with the respective flanges 115, 131 and 131' inserted into the corresponding receiving slots 111, 121 and 121' of the associated hubs 102 and 120, and then spot welded in place at the upper and lower extremities thereof as indicated by weld beads 116 in FIG. 3 and 119 in FIG. 6. Thereafter, the joints are brazed along the entirety of the lengths thereof.

Considering again the densely packed arrays of RCC and WDRC rod clusters as indicated by FIG. 2, it will be appreciated that the planar vane elements 112 and 113 of the RCC spider 100 and the planar vane elements, or integral portions thereof, 123, 124, 123', 124' and 125 of the WDRC spider 120 present, in the composite, a substantial linear length of planar, or sheetlike elements subjected to parallel flow conditions. The core outlet flow can produce a so-called "vortex street" behind the trailing edge of each such vane element. The resulting vortex-induced vibration may be of sufficient magnitude as to produce substantial wear and shortened life. The phenomenon of immersed two-dimensional vibration due to such a vortex street being formed behind the trailing edge of a planar element when subjected to parallel flow conditions has been investigated both experimentally and theoretically. (See: Blevins, R. D., FLOW-INDUCED VIBRATION, Van Nostrand Reinhold Co., 1977, page 18; R. Brepson et al., "Vibrations Induced by Von Karman Vortex Trail in Guide Vane Bends," FLOW-INDUCED STRUCTURAL VIBRATIONS, published by Symposium Karlsruhe (Germany), Aug. 14–16, 1972 and edited by Eduard Naudascher, published by Springer-Verlag, 1974. See also, Tebes, G. H., et al. "Hydroelastic Vibrations of Flat Plates Related to Trailing Edge Geometry," Transactions of the ASME, JOURNAL OF BASIC ENGINEERING, Dec., 1961.

For a vane element (e.g., any of the vane elements 112, 114 or 123–125) of approximately 5" in height and 0.32" in thickness, under the flow conditions developed in normal operation of a reactor of the type herein described, the shedding frequency of a vane may be computed as follows:

$$f_s = \frac{SU}{D}$$

where
 $f_s$ = Vortex shedding frequency [Hz.]
 $S$ = Strouhal number
 $U$ = Flow velocity past the vane [inch/sec.]
 $D$ = Characteristic length, vane thickness [inch]

The Strouhal number may be dependent upon the volume of the Reynolds number (Re). The Re may be calculated as follows.

$$Re = \frac{UD\rho}{\mu}$$

where
 Re = Reynolds number
 $U$ = Flow velocity past the vane [inch/sec.]
 $\rho$ = Fluid density, 6.11E−5 [lbf-sec$^2$/inch$^4$]
 $\mu$ = Fluid viscosity, 1.14E−8 [lbf-sec/inch$^2$]
 $D$ = Characteristic length, vane thickness [inch]

Thus the Reynolds number is:

Re = 6.38 E 5

A reasonably applicable Strouhal number may be extracted from Blevins, as:

S ≈ 0.20

From this, the calculated expected shedding frequency at operating conditions is:

$$f_s = \frac{SU}{D}$$

$$f_s = \frac{(0.20)(372)}{(.31)} = 240 \text{ Hz.}$$

The shedding frequency as thus computed (i.e., $f_s$ = 240 Hz) is quite high, compared to the lowest natural frequencies of the surrounding structural components—typically $f_n$ < 100 Hz. It thus has been recognized that the primary vortex shedding function passes through the structural frequency domain of these structural components during the transition in operation of the reactor from a down condition, in which zero or low flow exists, to a full flow condition as exists in normal operation. This is contrary to the normal, desired state, which is to have the vortex shedding frequency lower than 0.8 times the lowest natural resonant frequency of the structure. Due to the variations in operating conditions, and the associated different levels of flow velocity, the potential exists that the shedding frequency ($f_s$) may coincide with one of the structural natural frequencies ($f_n$). It therefore is desirable to decrease the magnitude of the shedding forcing functions on the spider by an appropriate trailing edge configuration, to mitigate any such forced response.

Whereas the foregoing references indicate that a number of different trailing edge configurations of planar sheets disposed in parallel flow conditions are available for decreasing the magnitude of the shedding forcing functions on such structures, the theoretical analyses do not take into account the stress conditions to which the spiders are subjected in the environment of a pressure vessel of a reactor system. Particularly, as before noted, the spiders must not only sustain substantial static weight, but must be capable of withstanding additional kinetic forces both in relation to the height adjustment operations, particularly in view of the need for assured, rapid translational movement of the RCC rod clusters when rapid shutdown of a reactor is required, and due to flow induced forces. These design conditions must also be achieved in a limited axial space envelope.

Conventional vane element designs, taking into account general hydrostatic flow conditions, have been based on the belief that a trailing edge configuration affording a gradual transition from the parallel planar surfaces serves to improve flow characteristics (e.g., trailing edge cross-sectional configurations ranging from semicircular to more gradually tapered forms). In fact, it has been determined that the tapered or curved surfaces extend the area of flow separation and expand the surface area subjected to the turbulent vortex which forms in the flow as it passes beyond the vane element. Moreover, tapered or entrant trailing edge configurations which reduce the flow separation problem have a reduced amount of structural material in the cross-section of the trailing edge—weakening the vane for a given height and thickness or, conversely, requiring that the longitudinal dimension of the vane element (i.e., the axial height) being increased to afford sufficient structural strength. Weakening of the vane elements is not acceptable, and the alternative of increasing height is not practical in view of the corresponding increase in height of the inner barrel assembly which would be required to accommodate the increased vane height in view of the significant concomitant increase in the cost of the vessel which would result.

Contrary to the standard semicircular cross-section trailing edge designs of prior art vane elements, and in accordance with the present invention, it has been determined that a square cross-sectional trailing edge configuration of the vane elements of the rod supporting spiders is near optimum, taking into account vortex in the flow and shedding frequency considerations, along with the required structural strength of the vane elements and the associate spiders and the restrictive allowable space envelope. The significant and determinative factors are to mitigate the shedding function so as to reduce the vibratory response of the structure, while maintaining maximum strength of the vane elements of a given size—and to achieve these results in a structure which is easy to manufacture, in the interests of mitigating costs. The square, or substantially square, cross-sectional configuration of the trailing edge has been determined to meet these design and operational criteria, and is deemed surprising and unexpected, as a departure from conventional designs. Moreover, the square cross-sectional trailing edge configuration furthermore contributes to ease, and thus lower costs, of manufacture of the vane elements—as contrasted even to the conventional semicircular and/or other tapered cross-sectional trailing edge configurations heretofore employed.

Accordingly, the vane elements 132 and 134 of the representative assembly 130 of FIGS. 7A to 7C have square cross-sectional trailing edges 132b and 134b, respectively, while, for purposes of convenience in the foregoing discussion and illustrations of the figures, retaining conventional semicircular leading edges 132a and 134a, respectively. Correspondingly, the vane elements 112, 112′, and 114, 114′, 123, 123′, 124, 124′, and 125 of FIGS. 5 and 6 have respective, square cross-sectional trailing edges 112b, 112b′, 114b, 114b′, 123b, 123b′, 124b and 124b′, and 125b, and semicircular leading edges 112a, 112a′, 114a, 114a′, 123a, 123a′, 124a, 124a′, and 125a.

Figure 9:
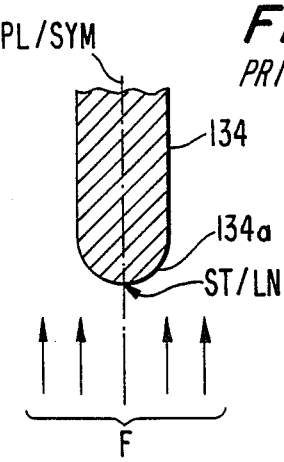
FIG. 9 is an elevational cross-section view of a segment of a spider vane having a conventional, semi-circular leading edge cross-sectional configuration, for illustrating flow conditions.

It is to be understood, however, that in accordance with a further feature of the present invention, the semicircular leading edges instead should be modified in accordance with the teachings hereinafter and particularly to have non-symmetrical cross-sectional configurations, such as those of FIGS. 13a through 13d or variations thereof, as now more fully explained, for avoiding the switching or oscillatory loadings to which prior art spider vanes are subjected as a result of flow-induced effects. Particularly, FIG. 9 illustrates in partial cross-section, a segment of a vane 134 as in FIG. 7c having a leading edge 134a of semicircular cross-section. The semi-circular configuration suggests itself as being nearly the obvious choice in the environment of the parallel axial flow F to which the vane 134 is subjected, the flow dividing equally about the vane 134 with respect to the plane of symmetry PL/SYM which intersects the semicircular leading edge 134a at a flow stagnation line ST/LN. The configuration thus, at least under ideal conditions, results in no net lateral loading on the vane 134—a seemingly obvious, desirable feature. It will be understood, of course, that the flow stagnation line ST/LN appears as only a single point and the plane of symmetry PL/SYM appears as a line, in the two dimensional illustration of FIG. 9.

Figure 10:
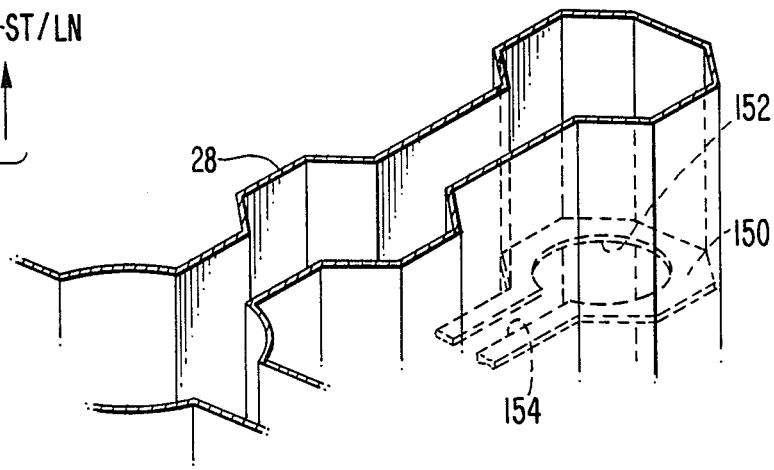
FIG. 10 is a perspective, broken-away and partially hidden view of an RCC rod guide and internal support plate.

In accordance with the present invention, the apparent desirability of providing a symmetrical cross-sectional configuration for the leading edge of a spider vane, be it of semicircular cross-section as in FIG. 9 or another, is in fact undesirable. This result is explained with reference to FIGS. 10, 11 and 12. In FIG. 10, there is shown in a broken-away and partially hidden illustration, a perspective view of a section of the RCC rod guide 28 (see FIG. 1) which accommodates an RCC rod cluster and its associated spider 100 (see FIGS. 3 and 4), taken in the section intermediate the upper and lower mounting means 36 and 37 thereof. Within the sidewall of the RCC rod guide 28, at spaced elevations, there are disposed horizontally oriented support plates 150 having an outer peripheral configuration corresponding to the interior surface of the side wall of the RCC rod guide 28. The support plate 150 includes an interior opening 152 for accommodating axial movement therethrough of a cylindrical rod support mount 108 and its associated rod, and a slotted opening, or channel, 154 for accommodating a corresponding vane section, e.g., vane 134 (FIGS. 7a, 7b and 7c) of the associated RCC spider 100. As will be appreciated, the RCC spider 100 temporarily resides within each of the support plates 150 during the required vertical movement thereof for the normal operational control of the reactor power output.

Figure 11:
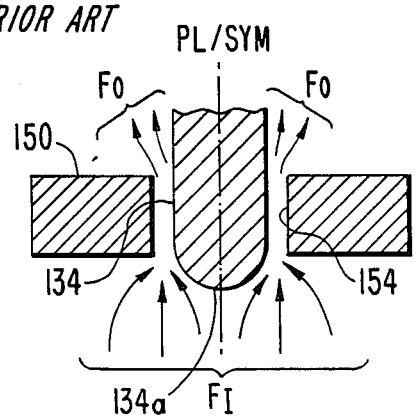
FIGS. 11 and 12 are elevational and cross-sectional views of the segment of the spider vane of FIG. 9 at successive elevations relative to, and as it passes through, a corresponding slot, or channel, in a rod guide internal support plate, as in FIG. 10.
Figure 12:
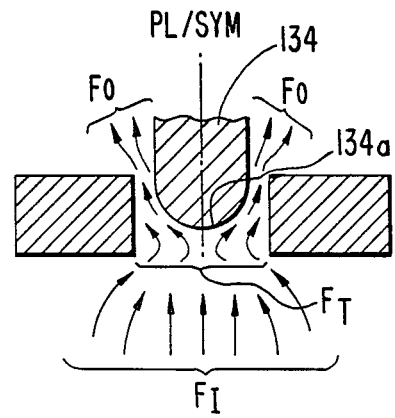

The broken-away vertical cross-sectional views of FIGS. 11 and 12 illustrate the condition of the vane 134 at successive stages of its vertical movement as it passes through the slot 154 of an associated support plate 150. As shown in FIG. 11, the normal parallel axial flow which is symmetrically distributed when the vane 134 is in free space (i.e., not within a support plate 150) and as shown in FIG. 9, is altered significantly when the vane 134 is within the slot 154 in a support plate 150. Specifically, the presence of the vane 134 within the slot 154 creates a significant flow restriction within the normally open, or free area of the slot 154 in the support plate 150. The impinging flow $F_I$ nevertheless must be maintained, with the result that a much higher velocity flow occurs through the now constricted slot 154 before emerging as the outlet flow $F_O$.

At a small range of the elevational locations of the vane 134, the flow restriction produces vibration of the vane 134 and of its associated spider. The effect is believed to be most pronounced when the leading edge 134a of the vane 134 is within the slot 154 of the support plate 150, as illustrated in FIG. 12. As shown therein, as the flow $F_I$ enters the entrance of slot 154, it is confronted by the leading edge 134a of the vane 134. Due to the symmetrical configuration of the leading edge 14a (i.e., semicircular or other), the flow pattern around the leading edge and emerging as the outlet flow $F_O$ may switch from one side of the vane to the other, and thus relatively to the plane of symmetry PL/SYM. It is believed that the flow switching mechanism occurs in the following manner.

Due to the turbulent condition of the flow, as illustrated in $F_t$ in FIG. 12, a greater proportion of the inlet flow $F_I$ will be directed to one side of the vane 134, the flow rate gradually building, or increasing, on that side and thereby initially increasing the lateral loading (i.e., in a direction perpendicular to the plane of symmetry PL/SYM) and thereby urging the vane away from the corresponding side wall of the slot 154 and increasing the clearance therethrough, concomitantly increasing the total flow through that side. The increased velocity of the flow through that more opened side, however, produces a decrease in the corresponding pressure on that side of the vane; at the same time, the opposite side of the vane, i.e., that side in which the flow in more significantly constricted or blocked, starts to develop a higher static pressure. The result is that the vane then is pushed laterally towards the opposite side of the slot where the flow rate is higher. Thereafter, the action repeats. Accordingly, there is produced a switching or oscillatory lateral loading on the vane 134 which correspondingly is transmitted to the spider and its associated hub as well as to the control rods supported by the spider and the drive system for the spiders. The resulting structural vibration clearly is potentially detrimental to the structural integrity of both the directly affected components and the associated components.

In accordance with the present invention, it has been recognized that a major factor in the initialization of the switching, or oscillatory loading phenomenon is the symmetrical cross-section of the vane leading edge. As before noted, this symmetry enables the static forces to build up on the side of the vane for which the corresponding flow has been reduced, because the most leading line, or edge, ST/LN (i.e., the flow stagnation line) is at the geometric plane of symmetry PL/SYM of the vane 134, and the flow $F_I$ encounters a significant frontal area on that side of the vane.

Figure 13A:
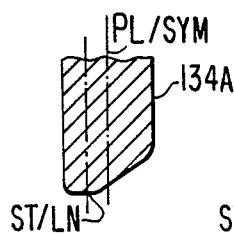
FIGS. 13A through 13D, inclusive, are segments of spider vanes having various different non-symmetrical leading edge cross-sectional configurations in accordance with the teachings of the present invention.
Figure 13B:
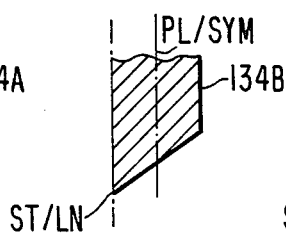
Figure 13C:
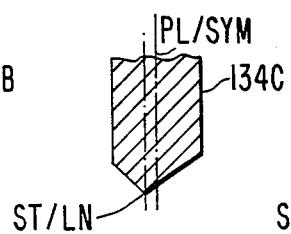
Figure 13D:
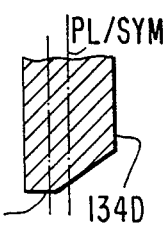

The present invention thus provides for off-setting the flow stagnation line of the vane leading edge away from the plane of symmetry PL/SYM. FIGS. 13A through 13d illustrate exemplary such cross-sectional configurations, in each of which the static flow line ST/LN is shifted away from the plane of symmetry PL/SYM of the vane, as a geometric whole (i.e., relative to its major planar surfaces). More particularly, vane 134A of FIG. 13A has a leading edge cross-section of a non-symmetrical, convex configuration. The leading edge cross-sectional configuration of vane 134B of FIG. 13B defines a single acute angle with respect to one of the major planar surfaces thereof, i.e., the left major planar surface as illustrated in FIG. 13B, in which the flow stagnation line ST/LN is displaced a maximum distance from the plane of symmetry PL/SYM. The leading edge cross-sectional configuration of the vane element 134C of FIG. 13C is convex, as in FIG. 13A, but is defined by a double acute angle relative to the respective major planar surfaces thereby to offset the flow stagnation line ST/LN from the plane of symmetry PL/SYM. Finally, the leading edge cross-sectional configuration of the vane element 134D of FIG. 13D defines a truncated acute angle with respect to one of the major planar surfaces, i.e., the right surface as shown in FIG. 13D; the flow stagnation line ST/LN again is offset from the plane of symmetry PL/SYM, but to a lesser degree than in FIG. 13B. As is apparent from FIGS. 13A through 13D, the extent of offset of the flow stagnation line ST/LN from the plane of symmetry PL/SYM may be adjusted by the configuration of the leading edge cross-section, to the extent desired. Any of the configurations of FIGS. 13A through 13D or variations thereof, which meet the aforestated criterion, when adapted as the leading edge geometry of a spider vane, will serve to mitigate the lateral vibratory loading on the vane and the resultant switching, or oscillatory, loadings applied thereto and the resulting vibration.

With reference to the planar views of the RCC spider 100 in FIG. 3 and the WDRC spider 120 in FIG. 5, it will be appreciated that the vanes are symmetrically disposed in generally diametric relationship about the respective central hubs 102 and 122. For ease of reference, the following discussion is directed to the RCC configuration of FIG. 3, but it will be understood to be equally applicable to the WDRC spider configuration of FIG. 5.

A non-symmetrical vane configuration, illustratively any of FIGS. 13A through 13D, may be afforded on each of the four vanes of the RCC spider 106 to produce a net torque in a given direction, e.g., counter-clockwise, on the drive rod connected to the spider; as a result, all similarly situated planar surfaces of the spider vanes would be urged against the corresponding, contiguous side wall of the slot 154 in the support plate 150 as those elements are illustrated in FIGS. 10 to 12. Alternatively, the offsets of the non-symmetrical leading edge configurations of successive pairs of angularly displaced vane elements, relative to the respective planes of symmetry, may be oppositely directed, progressing about the central hub 102, so as to produce laterally diagonal loading on the central hub of the spider. The non-symmetrical configuration of the spider vane leading edges, in any such arrangement, serves to eliminate the switching or oscillatory movement of the vanes and thus overcomes the resulting vibratory loading and the related, detrimental effects which are produced by the conventional, symmetrical leading edge configuration of spider vanes. The particular configuration selected is best determined from consideration of environmental factors within a given pressure vessel. For example, the configuration of FIG. 13B is optimum with regard to producing non-symmetrical lateral loading but is less desirable from the standpoint of the bending strength of the vane leading edge. The configurations of FIGS. 13A and 13D afford greater strength than that of FIG. 13B, but, due to the reduced off-set, correspondingly have a reduced capability of eliminating the flow switching problem. The configuration of FIG. 13C has flow-switching and strength characteristics intermediate those of FIGS. 13A and 13B. The configuration of FIG. 13D is easiest to manufacture whereas those of FIGS. 13B and 13C and somewhat more difficult, but easier than that of FIG. 13A. All thereof share the common characteristic that they comprise improvements over the standard, semicircular cross-sectional configuration of conventional spider vanes.

While modifications and adaptations of the present invention will be apparent to those of skill in the art, including slight variances from the generally square cross-sectional configuration of the trailing edge of the vane elements employed in spiders as herein disclosed, it is intended by the appended claims to cover all such modifications and adaptations which fall within the true spirit and scope of the present invention.

We claim as our invention;

1. A pressurized water reactor vessel, the vessel defining a predetermined axial direction of the flow of coolant therewithin and having plural spider assemblies supporting, for vertical movement within the vessel, respective clusters of rods in spaced, parallel axial relationship, parallel to the predetermined axial direction of coolant flow, and a rod guide for each spider assembly and respective cluster of rods, the rod guide having horizontally oriented support plates therewithin, each plate having an interior opening for accommodating axial movement therethrough of the spider assembly and respective cluster of rods, the opening defining plural radially extending channels and corresponding parallel interior wall surfaces of the support plate, the spider assembly comprising:

a hub of elongated configuration and defining a central axis, for positioning parallel to the predetermined axial direction of coolant flow;

control rod mounts for the respectively corresponding control rods of the cluster; and a vane assembly integrally connecting the control and mounts to the hub, the vane assembly comprising plural, planar vane elements, at least a predetermined number thereof being affixed to and extending radially from the hub and oriented so as to be received through respectively corresponding channels in each support plate, each said radially extending vane element having parallel, spaced major planar surfaces which are contiguous to the respective interior wall surfaces of the support plate defined by the radially extending channels when the vane element is received therewithin, said parallel, spaced major planar surfaces defining a plane of symmetry therebetween parallel to the central axis of the hub and each said vane element having a leading edge and a trailing edge relative to and extending transversely of the axial direction of coolant flow, the leading edge having a cross-sectional configuration in a plane perpendicular to the major parallel planar surfaces which is non-symmetrical relative to the plane of symmetry, the respective flow stagnation lines of the radially extending vane elements being off-set from the respective planes of symmetry thereof in a commonly oriented direction and producing in response to the coolant flow thereover a torsional load bias on the hub in a predetermined orientation for engaging the commonly oriented, spaced, major planar surfaces of the plural radially extending vanes against the respective, commonly oriented and contiguous interior wall surfaces of the support plate defined by the corresponding channels.

2. A pressure vessel having plural spider assemblies as recited in claim 1, wherein the trailing edge of each vane element of each spider assembly is of square cross-sectional configuration in a plane transverse to the major planar surfaces thereof and parallel to the direction of coolant flow.

3. A pressure vessel having spider assemblies as recited in claim 1, wherein each vane element leading edge of each spider assembly is of a non-symmetrical, convex cross-sectional configuration.

4. A pressure vessel having spider assemblies as recited in claim 1, wherein each vane element leading edge of each spider assembly cross-section defines a single acute angle with respect to one of the major planar surfaces thereof.

5. A pressure vessel having spider assemblies as recited in claim 1, wherein each vane element leading edge of each spider assembly cross-section defines double acute angles with respect to the respective planar surfaces.

6. A pressure vessel having spider assemblies as recited in claim 1, wherein each vane element leading edge of each spider assembly cross-section defines a truncated acute angle with respect to one of the major planar surfaces thereof.

* * * * *